Figure 1:
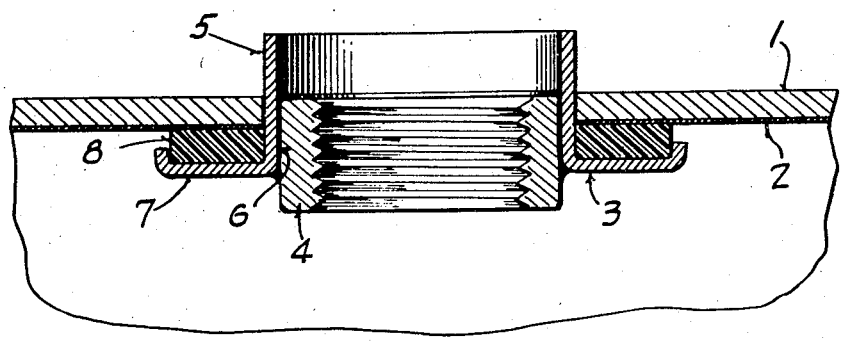

INVENTOR.
William C. Uhri
ATTORNEY.

Patented Sept. 28, 1948

2,450,173

UNITED STATES PATENT OFFICE 2,450,173

SEAL FOR TANK OPENINGS

William C. Uhri, Milwaukee, Wis., assignor to A. O. Smith Corporation, Milwaukee, Wis., a corporation of New York Application June 25, 1947, Serial No. 756,996

3 Claims. (Cl. 285—49)

This invention relates to a seal for a tank opening and has particular reference to the seal for the connection or cleanout opening of a domestic hot water tank which has a lining such as ceramic enamel to protect the same from corrosion by the hot water stored therein.

One object of the invention is to provide a seal which is readily assembled with a hot water tank.

Another object of the invention is to provide a seal for a hot water tank opening which positively seals off the approach of hot water to the face of the opening to prevent corrosion of the metal of the tank at the opening.

These and other objects of the invention will appear hereinafter in connection with the following description of the invention as illustrated in the accompanying drawing.

Figure 2:
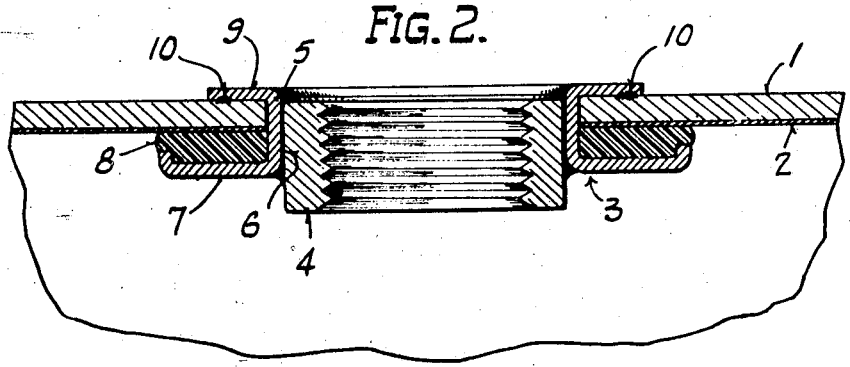

In the drawing:

Figure 1 is a longitudinal sectional view of the seal upon assembly in a tank; and Fig. 2 is a view similar to Fig. 1 with the seal finally assembled.

In the drawing there is shown a portion of a hot water tank 1 which has a corrosion protective lining 2 of ceramic enamel and is provided with a suitable opening in the wall thereof to receive the sealing unit 3 for supporting a cleanout plate, a thermostatic or heating element or to operate generally as a pipe connecting element.

Sealing unit 3 has a circular corrosion resistant stainless steel nipple or tubular element 4 which is shown as threaded on the inside to receive a connection or other part which may be secured thereto.

The stamped stainless steel corrosion resistant ferrule 5 encircles the greater portion of nipple 4 and the inside of ferrule 5 is welded or brazed to nipple 4 as at 6. The ferrule is considerably thinner than nipple 4.

A flange 7 is provided on the inner end portion of ferrule 5 and the flange extends radially from the body of the ferrule to overlap the tank wall outwardly of the opening therein for a substantial distance.

A washer 8 encircles ferrule 5 and is confined against the wall of tank 1 on the inside thereof by the radially extending flange 7 of the ferrule. The outer end of flange 7 is turned toward the tank wall to better confine washer 8. Washer 8 is of neoprene or other corrosion resistant compressible material.

The outer end portion of ferrule 5 comprises the flange 9 which extends radially from the body of the ferrule in much the same manner as inner flange 7, to overlap the outer surface of the tank wall around the opening therein.

Flange 9 may be stud or spot welded to the outer surface of the tank as at 10 to prevent the seal from turning in service.

In assembling the seal ferrule 5 is first welded or brazed to nipple 4. Upon assembly, as shown in Fig. 1, ferrule 5 encircles the greater portion of nipple 4, flange 7 extends radially therefrom, and the outer portion of the ferrule projects axially from the nipple. The gasket or washer 8 is next assembled around the ferrule and against flange 7.

After tank 1 is prepared by lining the same with ceramic enamel 2, seal 3 is inserted from the inside through the opening prepared therefor in the tank wall until gasket 8 contacts lining 2. This assembly is illustrated in Fig. 1.

Thereafter, as shown in Fig. 2, the outer end of ferrule 5 projecting from nipple 4 is peened over against the outer surface of the tank wall to form outer flange 9. The latter may then be secured to the tank wall by welds 10.

When the outer end of ferrule 5 is peened over as described, gasket 8 is compressed by flange 7 against the wall of the tank and positively seals off the approach of fluid contained in the tank to the face of the opening to eliminate corrosion at the joint between the tank and seal. The gasket is confined between the tank wall and the flange 7 and thus resists any tendency to swell due to absorption in service.

The invention provides a connection which positively seals off the approach to the joint between the seal and tank and which is readily assembled.

Various embodiments of the invention may be employed within the scope of the accompanying claims.

I claim:

1. In a seal for an opening in a hot water storage tank having a corrosion resistant lining to protect the tank from corrosion by contained fluid, a tubular generally thin corrosion resistant ferrule secured within the opening in said tank with a portion thereof projecting inwardly and outwardly of the opening, a resilient gasket encircling said ferrule on the inside of said tank, a flange on the inner end of the ferrule disposed to confine said gasket against the inside of the tank around said opening to seal off the approach of the contained fluid to the edge of the opening, and a corrosion resistant tubular member secured to the inside of said ferrule for supporting an element therein.

2. In a seal for an opening in a hot water storage tank having a corrosion resistant lining to protect the tank from corrosion by contained fluid, a tubular generally thin corrosion resistant ferrule secured within the opening in said tank, a flange on the outer end portion of said ferrule bearing against the outer surface of the wall of the tank around said opening, an inner flange on the inner end portion of said ferrule, a resilient gasket encircling said ferrule on the inside of said tank and confined against the tank wall by said inner flange to seal off the approach of contained fluid to the edge of said opening, and a corrosion resistant tubular element welded to the inside of said ferrule for supporting an element therein.

3. In a seal for an opening of a hot water storage tank having a corrosion resistant lining to protect the tank from corrosion by contained fluid, a tubular generally thin corrosion resistant ferrule disposed within the opening in said tank, an outer flange on the outer end portion of said ferrule bearing against the outer surface of the wall of the tank around said opening, a weld securing said outer flange to the tank wall, an inner flange on the inner end portion of said ferrule extending radially therefrom and overlapping the tank wall for a substantial distance, a resilient gasket encircling sad ferrule on the inside of said tank and confined against the tank wall by said inner flange to seal off the approach of contained fluid to the edge of said opening, and a corrosion resistant tubular element secured to the inside of said ferrule for supporting an element therein.

WILLIAM C. UHRI.

No references cited.